United States Patent
Huang et al.

(10) Patent No.: US 10,282,909 B2
(45) Date of Patent: May 7, 2019

(54) VIRTUAL REALITY SYSTEM, OPERATING METHOD FOR MOBILE DEVICE, AND NON-TRANSITORY COMPUTER READABLE STORAGE MEDIUM

(71) Applicant: HTC Corporation, Taoyuan (TW)

(72) Inventors: Guei-Yu Huang, Taoyuan (TW); Kang-Yu Wang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/466,884

(22) Filed: Mar. 23, 2017

(65) Prior Publication Data

US 2018/0276893 A1 Sep. 27, 2018

(51) Int. Cl.
| | |
|---|---|
| *G06T 19/00* | (2011.01) |
| *G06F 3/01* | (2006.01) |
| *G06F 3/0481* | (2013.01) |
| *G02B 27/01* | (2006.01) |
| *G06F 3/0346* | (2013.01) |
| *G06T 7/73* | (2017.01) |
| *G09G 5/00* | (2006.01) |

(52) U.S. Cl.
CPC .......... *G06T 19/006* (2013.01); *G02B 27/017* (2013.01); *G06F 3/011* (2013.01); *G06F 3/0346* (2013.01); *G06F 3/04815* (2013.01); *G06T 7/73* (2017.01); *G09G 5/003* (2013.01); *G09G 2370/02* (2013.01)

(58) Field of Classification Search
None
See application file for complete search history.

(56) References Cited

U.S. PATENT DOCUMENTS

| | | | |
|---|---|---|---|
| 2012/0299827 A1* | 11/2012 | Osborn | G09G 5/08 345/158 |
| 2013/0117377 A1* | 5/2013 | Miller | H04L 67/38 709/205 |
| 2016/0093108 A1* | 3/2016 | Mao | A63F 13/42 345/633 |

(Continued)

FOREIGN PATENT DOCUMENTS

| | | |
|---|---|---|
| TW | 200901089 A | 1/2009 |
| TW | 201512765 A | 4/2015 |
| WO | 2014190106 A1 | 11/2014 |

OTHER PUBLICATIONS

Corresponding Taiwanese office action dated Jul. 18, 2017.
Corresponding extended European search report dated Nov. 22, 2017.

*Primary Examiner* — Ryan M Gray
(74) *Attorney, Agent, or Firm* — CKC & Partners Co., LLC

(57) ABSTRACT

A virtual reality (VR) system includes a VR display device, a first VR controller, a mobile device, and a VR processing device. The VR display device is configured to display a VR environment corresponding to a position and rotating angles of the VR display device. The mobile device is attached to the first VR controller. The VR processing device is configured for acquiring a position and rotating angles of the first VR controller; and transmitting the position and the rotating angles of the first VR controller to the mobile device via a network, so as to allow the mobile device to operably display a VR object of the VR environment corresponding to the position and the rotating angles of the first VR controller.

12 Claims, 6 Drawing Sheets

(56) References Cited

U.S. PATENT DOCUMENTS

| | | |
|---|---|---|
| 2016/0232713 A1* | 8/2016 | Lee ...................... G06T 19/006 |
| 2017/0039986 A1 | 2/2017 | Lanier et al. |
| 2017/0139474 A1* | 5/2017 | Rochford ................ G06F 3/012 |
| 2017/0193704 A1* | 7/2017 | Leppanen ............. G06F 3/1454 |
| 2017/0363867 A1* | 12/2017 | Poulos ............... G02B 27/0103 |
| 2018/0108179 A1* | 4/2018 | Tomlin ............... G02B 27/0172 |

* cited by examiner

VIRTUAL REALITY SYSTEM, OPERATING METHOD FOR MOBILE DEVICE, AND NON-TRANSITORY COMPUTER READABLE STORAGE MEDIUM

BACKGROUND

Technical Field

The present disclosure relates to an electronic device, a method, and a non-transitory computer readable storage medium. More particularly, the present disclosure relates to a virtual reality system, an operating method for mobile device, and a non-transitory computer readable storage medium.

Description of Related Art

With advances in electronic technology, virtual reality (VR) systems are being increasingly used.

A VR system includes at least one VR display, at least one VR controller, and a VR processing device. The VR processing device can detect movements of a user through the VR controller and the VR display, and control the VR display to display correspondingly. However, it is difficult for a person to join the VR environment without another VR display.

SUMMARY

One aspect of the present disclosure is related to a virtual reality (VR) system. In accordance with one embodiment of the present disclosure, the system includes a VR display device, a first VR controller, a mobile device, and a VR processing device. The VR display device is configured to display a VR environment corresponding to a position and rotating angles of the VR display device. The mobile device is attached to the first VR controller. The VR processing device is configured for acquiring a position and rotating angles of the first VR controller and transmitting the position and the rotating angles of the first VR controller to the mobile device via a network, so as to allow the mobile device to operably display a VR object of the VR environment corresponding to the position and the rotating angles of the first VR controller.

In accordance with one embodiment of the present disclosure, the mobile device is further configured for capturing real world images via a camera of the mobile device, and operably displaying the VR object on the real world images corresponding to the position and the rotating angles of the first VR controller.

In accordance with one embodiment of the present disclosure, the mobile device is further configured for operably displaying the VR object with the VR environment corresponding to the position and the rotating angles of the first VR controller.

In accordance with one embodiment of the present disclosure, the VR processing device is further configured for transmitting the position and the rotating angles of the VR display device to the mobile device via the network, so as to allow the mobile device to operably display the VR object corresponding to the position and the rotating angles of the VR display device and the position and the rotating angles of the first VR controller.

In accordance with one embodiment of the present disclosure, the VR processing device is further configured for controlling the VR display device to operably display another VR object corresponding to the position and the rotating angles of the VR display device and the position and the rotating angles of the first VR controller.

In accordance with one embodiment of the present disclosure, the mobile device is further configured for acquiring a position of the mobile device corresponding to the position of the first VR controller, and operably displaying the VR object corresponding to the position of the mobile device.

In accordance with one embodiment of the present disclosure, the VR processing device is further configured for acquiring a position and rotating angles of a second VR controller, and transmitting the position and the rotating angles of the second VR controller to the mobile device via the network, so as to allow the mobile device to operably display the VR object corresponding to the position and the rotating angles of the first VR controller.

In accordance with one embodiment of the present disclosure, the VR processing device is further configured for receiving a real time image displayed on the mobile device, and controlling the VR display device to operably display the real time image displayed on the mobile device.

Another aspect of the present disclosure is related to an operating method of a mobile device. In accordance with one embodiment of the present disclosure, the operating method includes receiving a position and rotating angles of a sensor attached to the mobile device from a VR processing device via a network, in which the VR processing device communicates with a VR display device, the VR display device is configured to display a VR environment corresponding to a position and rotating angles of the VR display device; and operably displaying a VR object of the VR environment corresponding to the position and the rotating angles of the sensor.

In accordance with one embodiment of the present disclosure, the operating method further includes capturing real world images via a camera of the mobile device, and operably displaying the VR object on the real world images corresponding to the position and the rotating angles of the sensor.

In accordance with one embodiment of the present disclosure, the operating method further includes operably displaying the VR object with the VR environment corresponding to the position and the rotating angles of the first VR controller.

In accordance with one embodiment of the present disclosure, the operating method further includes receiving the position and the rotating angles of the VR display device from VR processing device via the network, and operably displaying the VR object corresponding to the position and the rotating angles of the VR display device and the position and the rotating angles of the sensor.

In accordance with one embodiment of the present disclosure, the operating method further includes acquiring a position of the mobile device corresponding to the position of the sensor, and operably displaying the VR object corresponding to the position of the mobile device.

In accordance with one embodiment of the present disclosure, the operating method further includes receiving a position and rotating angles of a VR controller from the VR processing device via the network, and operably displaying the VR object corresponding to the position and the rotating angles of the sensor.

Another aspect of the present disclosure is related to a non-transitory computer readable storage medium. In accordance with one embodiment of the present disclosure, the non-transitory computer readable storage medium stores one or more programs including instructions, which when executed, causes one or more processing components to perform operations including receiving a position and rotating angles of a sensor attached to the mobile device from a VR processing device via a network, in which the VR processing device communicates with a VR display device, the VR display device is configured to display a VR environment corresponding to a position and rotating angles of the VR display device; and operably displaying a VR object of the VR environment corresponding to the position and the rotating angles of the sensor.

In accordance with one embodiment of the present disclosure, the non-transitory computer readable storage medium includes instructions, which when executed, causes one or more processing components to further perform operations including capturing real world images via a camera of the mobile device, and operably displaying the VR object on the real world images corresponding to the position and the rotating angles of the sensor.

In accordance with one embodiment of the present disclosure, the non-transitory computer readable storage medium includes instructions, which when executed, causes one or more processing components to further perform operations including operably displaying the VR object with the VR environment corresponding to the position and the rotating angles of the first VR controller.

In accordance with one embodiment of the present disclosure, the non-transitory computer readable storage medium includes instructions, which when executed, causes one or more processing components to further perform operations including receiving the position and the rotating angles of the VR display device from VR processing device via the network, and operably displaying the VR object corresponding to the position and the rotating angles of the VR display device and the position and the rotating angles of the sensor.

In accordance with one embodiment of the present disclosure, the non-transitory computer readable storage medium includes instructions, which when executed, causes one or more processing components to further perform operations including acquiring a position of the mobile device corresponding to the position of the sensor, and operably displaying the VR object corresponding to the position of the mobile device.

In accordance with one embodiment of the present disclosure, the non-transitory computer readable storage medium includes instructions, which when executed, causes one or more processing components to further perform operations including receiving a position and rotating angles of a VR controller from the VR processing device via the network, and operably displaying the VR object corresponding to the position and the rotating angles of the sensor.

Another aspect of the present disclosure is related to a VR processing device. In accordance with one embodiment of the present disclosure, the VR processing device includes one or more processing components, a memory, and one or more programs. The memory is electrically connected to the one or more processing components. The one or more programs are stored in the memory and configured to be executed by the one or more processing components. The one or more programs include instructions for acquiring a first signal with respect to a position and rotating angles of a first VR controller; and transmitting the position and the rotating angles of the first VR controller to a mobile device attached to the first VR controller via a network, so as to allow the mobile device to operably display a VR object of the VR environment corresponding to the position and the rotating angles of the first VR controller.

Through the operations of one embodiment described above, a person can see the VR object without using another VR display device.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
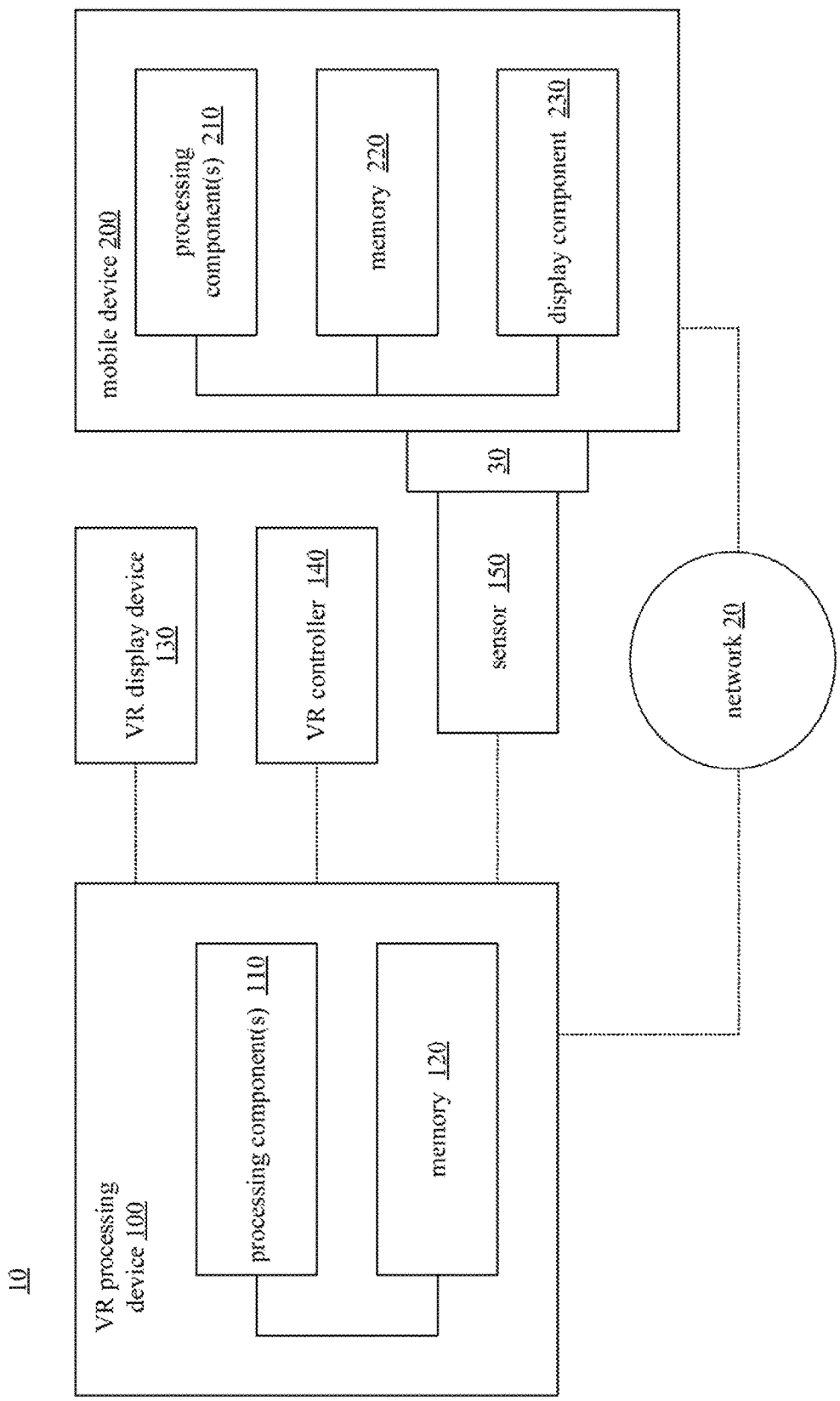
FIG. 1 is a schematic block diagram of a virtual reality (VR) system in accordance with one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

FIG. 1 is a schematic block diagram of a virtual reality (VR) system 10 in accordance with one embodiment of the present disclosure. In this embodiment, the VR system 10 includes a VR processing device 100, a VR display device 130, a VR controller 140, a sensor 150, and a mobile device 200.

In one embodiment, the VR processing device 100 communicates with the VR display device 130, the VR controller 140, and the sensor 150 via wired or wireless connection. In one embodiment, the VR processing device 100 communicates with the mobile device 200 via a wireless network 20. In one embodiment, the sensor 150 is attached to the mobile device 200. In one embodiment, the sensor 150 is attached to the mobile device 200 by using a fastener or an adhesive 30. In one embodiment, the sensor 150 is integrated to the mobile device 200.

In one embodiment, the VR processing device 100 is integrated with the VR display device 130 or the VR controller 140, but the present disclosure is not limited to the embodiment described herein. In one embodiment, other numbers of the VR display device 130, the VR controller 140, the sensor 150, the fastener 30, and/or the mobile device 200 are within the contemplated scope of the present disclosure. In one embodiment, the VR controller 140 is omitted on a basis of actual requirements, and the present disclosure is not limited to the embodiment described herein.

In one embodiment, the VR system 10 further includes base stations (e.g., lighthouses) (not shown) for positioning and/or detecting tilt angles (e.g., rotating angles) of the VR display device 130, the VR controller 140, and/or the sensor 150. However, other positioning method and/or method for detecting tilt angles are within the contemplated scope of the present disclosure.

In one embodiment, the VR processing device 100 includes one or more processing components 110 and a memory 120. In this embodiment, the one or more processing components 110 are electrically connected to the memory 120. In one embodiment, the VR processing device 100 further includes signal transceivers for transmitting and receiving signals between the VR processing device 100 and the VR display device 130, signals between the VR processing device 100 and the VR controller 140, and/or signals between the VR processing device 100 and the sensor 150. In one embodiment, the VR processing device 100 further includes a network component (e.g., a wireless network interface card) for communicating with the mobile device 200 via the network 20.

In one embodiment, the mobile device 200 includes one or more processing components 210, a memory 220, and a display component 230. In this embodiment, the processing component one or more processing components 210 is electrically connected to the memory 220 and the display component 230. In one embodiment, the mobile device 200 further includes a network component (e.g., network interface card) for communicating with the VR processing device 100 via the network 20.

In one embodiment, the one or more processing components 110 and/or the one or more processing components 210 can be realized by, for example, one or more processors, such as central processors and/or microprocessors, but are not limited in this regard. In one embodiment, each of the memory 120 and the memory 220 includes one or more memory devices, each of which comprises, or a plurality of which collectively comprise a computer readable storage medium. The computer readable storage medium includes a read-only memory (ROM), a flash memory, a floppy disk, a hard disk, an optical disc, a flash disk, a flash drive, a tape, a database accessible from a network, and/or any storage medium with the same functionality that can be contemplated by persons of ordinary skill in the art to which this invention pertains. In one embodiment, each of the VR display device 130 and the display component 230 can be realized by, for example, a display, such as a liquid crystal display, or an active matrix organic light emitting diode (AMOLED) display, but is not limited in this regard. In one embodiment, the VR controller 140 can be realized by, for example, a handheld controller, such as a controller for Vive or a controller for Gear, but is not limited in this regard.

In one embodiment, the sensor 150 may be realized by, for example, a lighthouse sensor, but is not limited in this regard. In one embodiment, the sensor 150 may be similar to the sensor in the VR controller 140 for positioning and detecting rotating angles of the VR controller 140, but is not limited in this regard. In one embodiment, the sensor 150 may be another VR controller having function and structure identical to the VR controller 140, but is not limited in this regard.

In one embodiment, the one or more processing components 110 runs or executes various software programs and/or sets of instructions stored in memory 120 to perform various functions for the VR processing device 100 and to process data. In one embodiment, the one or more processing components 210 runs or executes various software programs and/or sets of instructions stored in memory 220 to perform various functions for the mobile device 200 and to process data.

It should be noted that the ways in which the devices and components in the VR system 10 realized are not limited by the embodiments described above. In addition, the connections among these devices and components are not limited by the embodiments described above. Any configuration of these devices and components and interconnections there among that would enable the VR system 10 to practice the technical features described below and/or in the claims can be used herein.

In one embodiment, the one or more processing components 110 controls the VR display device 130 to display a VR environment. In one embodiment, the one or more processing components 110 acquires a first signal with respect to a position and rotating angles of the sensor 150, and transmits the position and rotating angles of the sensor 150 to the mobile device 200, so as to allow the mobile device 200 to operably display VR objects, which belongs to the VR environment, corresponding to the position and rotating angles of the sensor 150. For example, when the position and/or rotating angles of the sensor 150 are changed, the mobile device 200 operably displays the VR objects with a different angle and/or a different distance.

In one embodiment, since the sensor 150 is attached or fixed to the mobile device 200, the position and rotating angles of the sensor 150 may be substantially identical to the position and rotating angles of the mobile device 200. That is, through such a configuration, the mobile device 200 can display the VR objects corresponding to the position and rotating angles of the mobile device 200, so that a person can see the VR objects through the mobile device 200, instead of using another VR display device 130.

It should be noted that, the term "operably" used above indicates that the display component 230 may display the VR objects when the mobile device 200 is directed toward these VR objects, and may not display these VR objects when the mobile device 200 is not directed toward these VR objects. In the paragraphs below, the term "operably" would be used in a similar manner, and the meaning thereof will not be repeated.

Details of the present disclosure are provided with reference to FIGS. 2-5, but the present disclosure is not limited to the illustrative examples described below.

Figure 2:
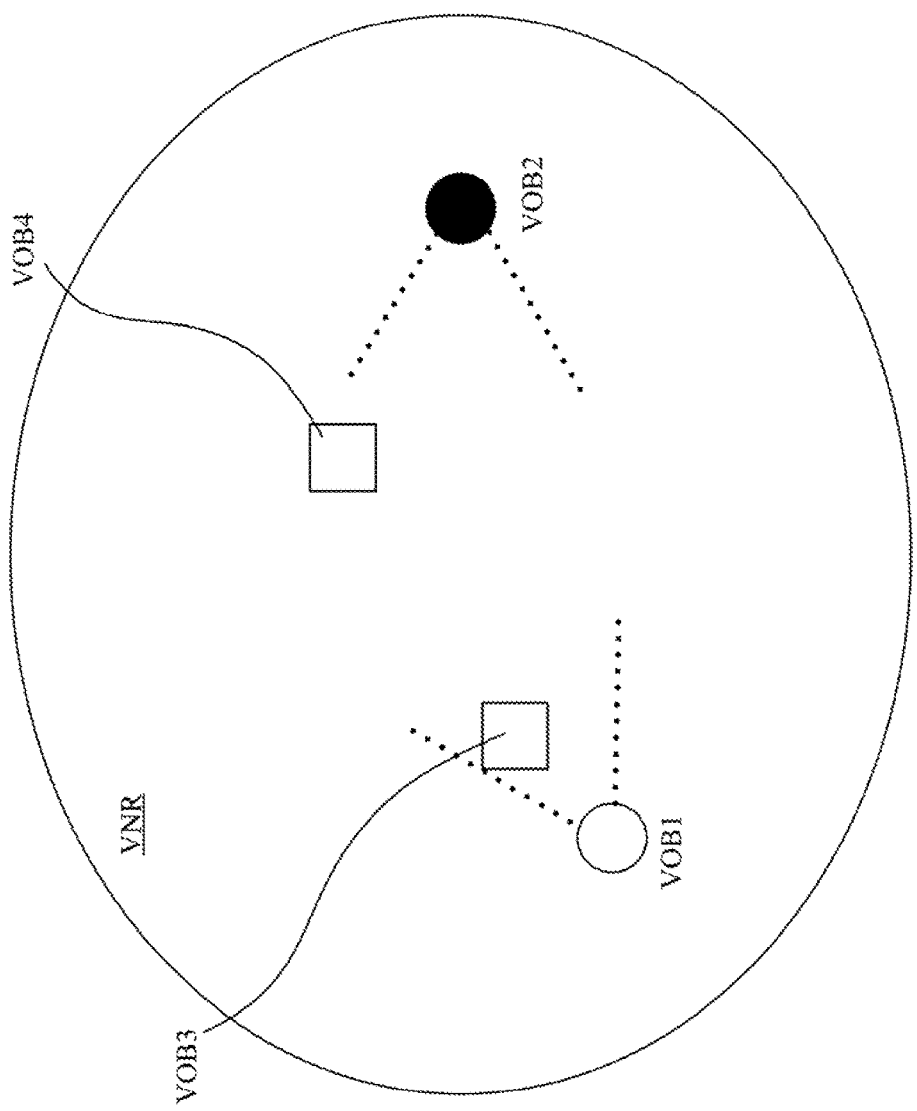
FIG. 2 illustrates an illustrative example of the VR system in accordance with one embodiment of the present disclosure.
Figure 3:
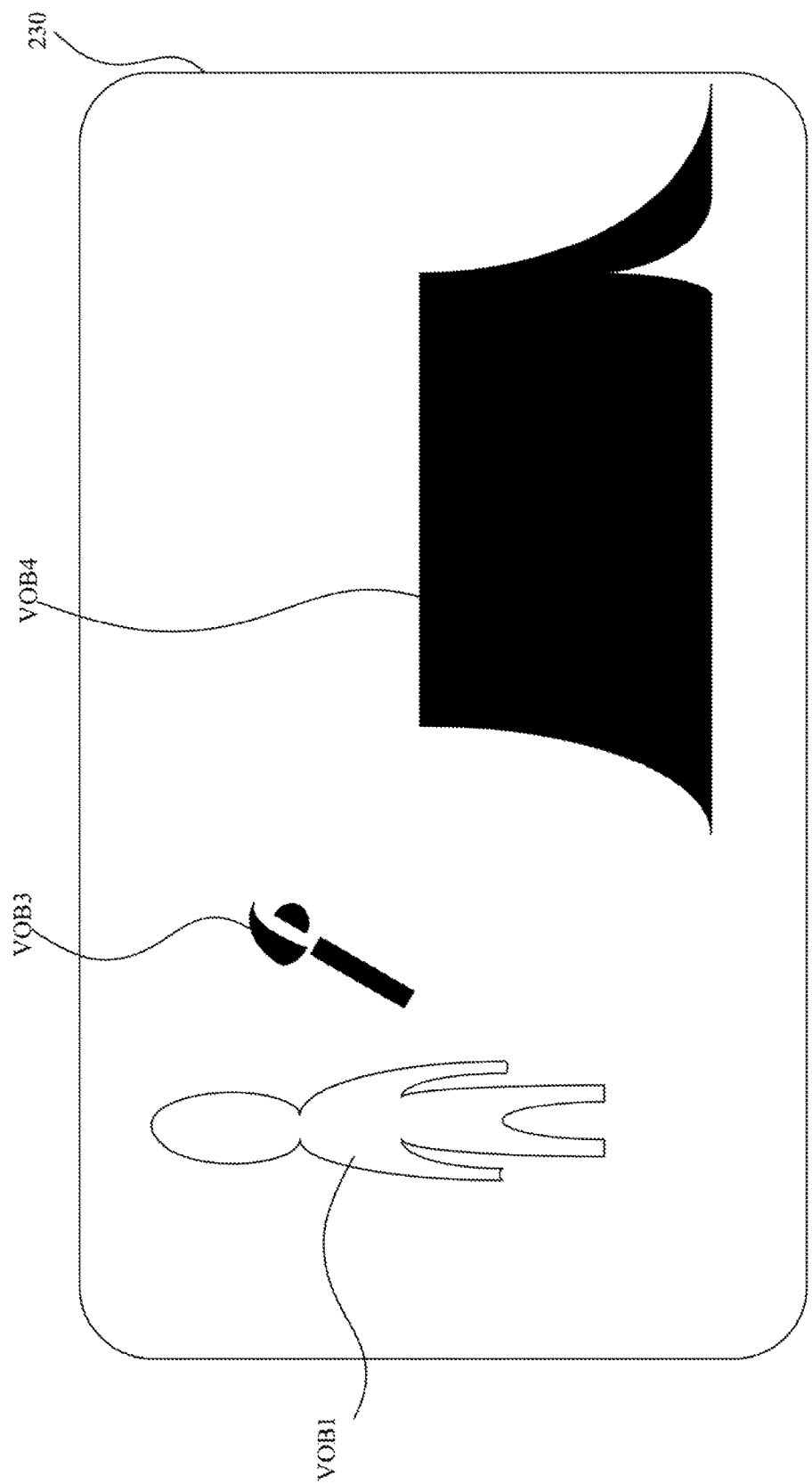
FIG. 3 illustrates an illustrative example of the VR system in accordance with one embodiment of the present disclosure.
Figure 4:
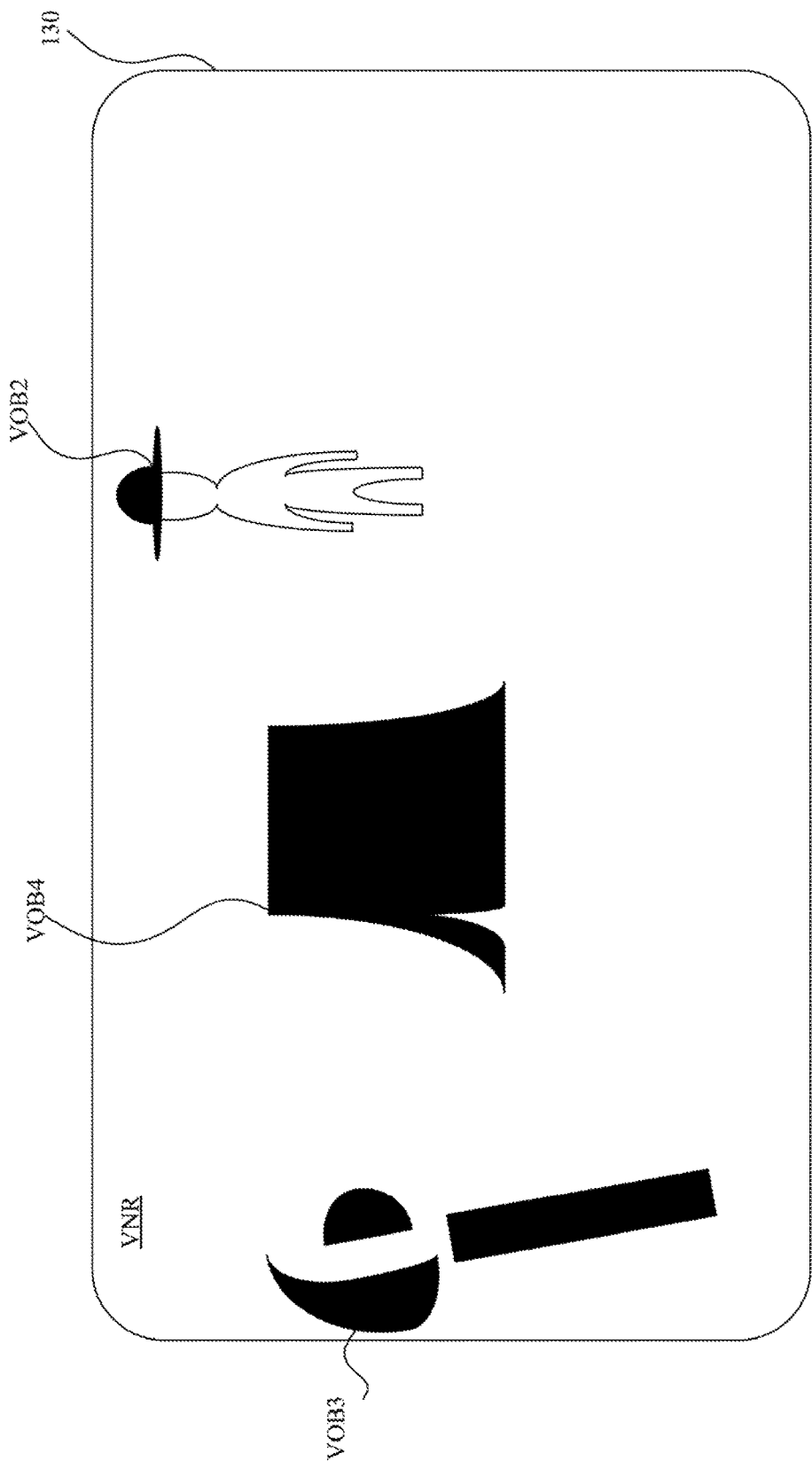
FIG. 4 illustrates an illustrative example of the VR system in accordance with one embodiment of the present disclosure.

In this illustrative example, the one or more processing components 110 can control the VR display device 130 to display a VR environment VRN (see FIGS. 2 and 4). In this illustrative example, there may be VR objects VOB1-VOB4 in the VR environment VRN. In this example, a position and an orientation of the VR object VOB1 corresponds to the position and the rotating angles of the VR display device 130, a position and an orientation of the VR object VOB2 corresponds to the position and the rotating angles of the sensor 150, and a position and an orientation of the VR object VOB3 corresponds to the position and the rotating angles of the VR controller 140.

In one embodiment, the sensor 150 can sense the position and the rotating angles of itself. The one or more processing components 110 can acquire the position and the rotating angles of the sensor 150 from the sensor 150 through the connection therebetween. In one embodiment, the one or more processing components 110 can transmit the position and the rotating angles of sensor 150 to the mobile device 200 via the network 20, so as to allow the mobile device 200 to operably display one or more of the VR objects VOB1, VOB3, VOB4 in the VR environment VRN corresponding to the position and the rotating angles of the sensor 150.

In one embodiment, the VR display device 130 can sense the position and the rotating angles of itself. The one or more processing components 110 may acquire the position and the rotating angles of the VR display device 130 through the connection therebetween, and transmit the position and the rotating angles of the VR display device 130 to the mobile device 200 via the network 20. The one or more processing components 210 may receive the position and the rotating angles of the VR display device 130 via the network 20, and control the display component 230 to operably display the VR object VOB1 corresponding to the position and the rotating angles of the VR display device 130 and the position and the rotating angles of the sensor 150 (see FIG. 3). For example, when the position and/or rotating angles of the VR display device 130 are changed to other position and/or rotating angles, the display component 230 may operably display the VR object VOB1 with a different angle and/or a different distance.

In one embodiment, the VR controller 140 can sense the position and the rotating angles of itself. The one or more processing components 110 may acquire the position and the rotating angles of the VR controller 140 through the connection therebetween, and transmit the position and the rotating angles of the VR controller 140 to the mobile device 200 via the network 20. The one or more processing components 210 may receive the position and the rotating angles of the VR controller 140 via the network 20, and control the display component 230 to operably display the VR object VOB3 corresponding to the position and the rotating angles of the VR controller 140 and the position and the rotating angles of the sensor 150 (see FIG. 3).

In one embodiment, the one or more processing components 110 may acquire the position and the orientation of the VR object VOB4, and transmit the position and the orientation of the VR object VOB4 to the mobile device 200 via the network 20. The one or more processing components 210 may receive the position and the orientation of the VR object VOB4 via the network 20, and control the display component 230 to operably display the VR object VOB4 corresponding to the position and the orientation of the VR object VOB4 and the position and the rotating angles of the sensor 150 (see FIG. 3).

Through the operations described above, a person can see the VR objects VOB1, VOB3, VOB4 through the mobile device 200, instead of using another VR display device 130.

In one embodiment of the present disclosure, the one or more processing components 210 may acquire the model of the VR objects VOB1, VOB3, VOB4 from the VR processing device 100 via the network 20. In another embodiment, the one or more processing components 210 acquires the model of the VR objects VOB1, VOB3, VOB4 from an application installed on the mobile device 200. However, another way to acquire the model of the VR objects VOB1, VOB3, VOB4 is within the contemplated scope of the present disclosure.

In one embodiment of the present disclosure, after the mobile device 200 receiving the position and the rotating angles of the sensor 150, the one or more processing components 210 may acquire the position of the mobile device 200 according to the position of the sensor 150, and control the display component 230 to operably display one or more of the VR objects VOB1, VOB3, VOB4 according to the position and/or the rotating angles of the mobile device 200. For example, there may exist an offset (e.g., +10 cm on z axis) between the sensor 150 and the mobile device 200, the one or more processing components 210 can acquire the position of the mobile device 200 (e.g., with xyz coordinates (+5, +5, +5)) according to the position of the sensor 150 (e.g., with xyz coordinates (+5, +5, −5)) when the rotating angles of the sensor 150 is (0, 0, 0).

Additionally, in one embodiment of the present disclosure, after the mobile device 200 receiving the position and the rotating angles of the sensor 150, the one or more processing components 210 may acquire the rotating angles of the mobile device 200 according to the position and/or the rotating angles of the sensor 150, and control the display component 230 to operably display one or more of the VR objects VOB1, VOB3, VOB4 according to the rotating angles of the mobile device 200.

In one embodiment of the present disclosure, the one or more processing components 210 may control a camera component of the mobile device 200 to capture real world images, and control the display component 230 to operably display one or more of the VR objects VOB1, VOB3, VOB4 on the real world images corresponding to the position and the rotating angles of the 150. That is, the display component 230 may operably display one or more of the VR objects VOB1, VOB3, VOB4 and the real world images concurrently.

In one embodiment of the present disclosure, the one or more processing components 210 may control the display component 230 to operably display one or more of the VR objects VOB1, VOB3, VOB4 with the VR environment corresponding to the position and the rotating angles of the 150. That is, the display component 230 may operably display one or more of the VR objects VOB1, VOB3, VOB4 and the VR environment VRN concurrently.

In one embodiment of the present disclosure, the one or more processing components 210 may acquire the model of the VR environment VRN from the VR processing device 100 via the network 20. In another embodiment, the one or more processing components 210 may acquire the model of the VR environment VRN from an application installed on the mobile device 200. However, another way to acquire the model of the VR environment VRN is within the contemplated scope of the present disclosure.

Reference is made to FIG. 4. In one embodiment, after the one or more processing components 110 acquiring the position and the rotating angles of the VR display device 130 and the position and the rotating angles of the sensor 150, the one or more processing components 110 may control the VR display device 130 to display the VR object VOB2 corresponding to the position and the rotating angles of the VR display device 130 and the position and the rotating angles of the sensor 150.

In an alternative embodiment, the mobile device 200 may transmit the position and/or the rotating angles of the mobile device 200 to the VR processing device 110, so as to allow the one or more processing components 110 may control the VR display device 130 to display the VR object VOB2 corresponding to the position and/or the rotating angles of the mobile device 200.

In one embodiment, after the one or more processing components 110 acquiring the position and the rotating angles of the VR display device 130 and the position and the rotating angles of the VR controller 140, the one or more processing components 110 may control the VR display device 130 to display the VR object VOB3 corresponding to the position and the rotating angles of the VR display device 130 and the position and the rotating angles of the VR controller 140.

In one embodiment, after the one or more processing components 110 acquiring the position and the rotating angles of the VR display device 130 and the position and the orientation of the VR object VOB4, the one or more processing components 110 may control the VR controller 140 to display the VR object VOB4 corresponding to the position and the rotating angles of the VR display device 130 and the position and the orientation of the VR object VOB4.

Figure 5:
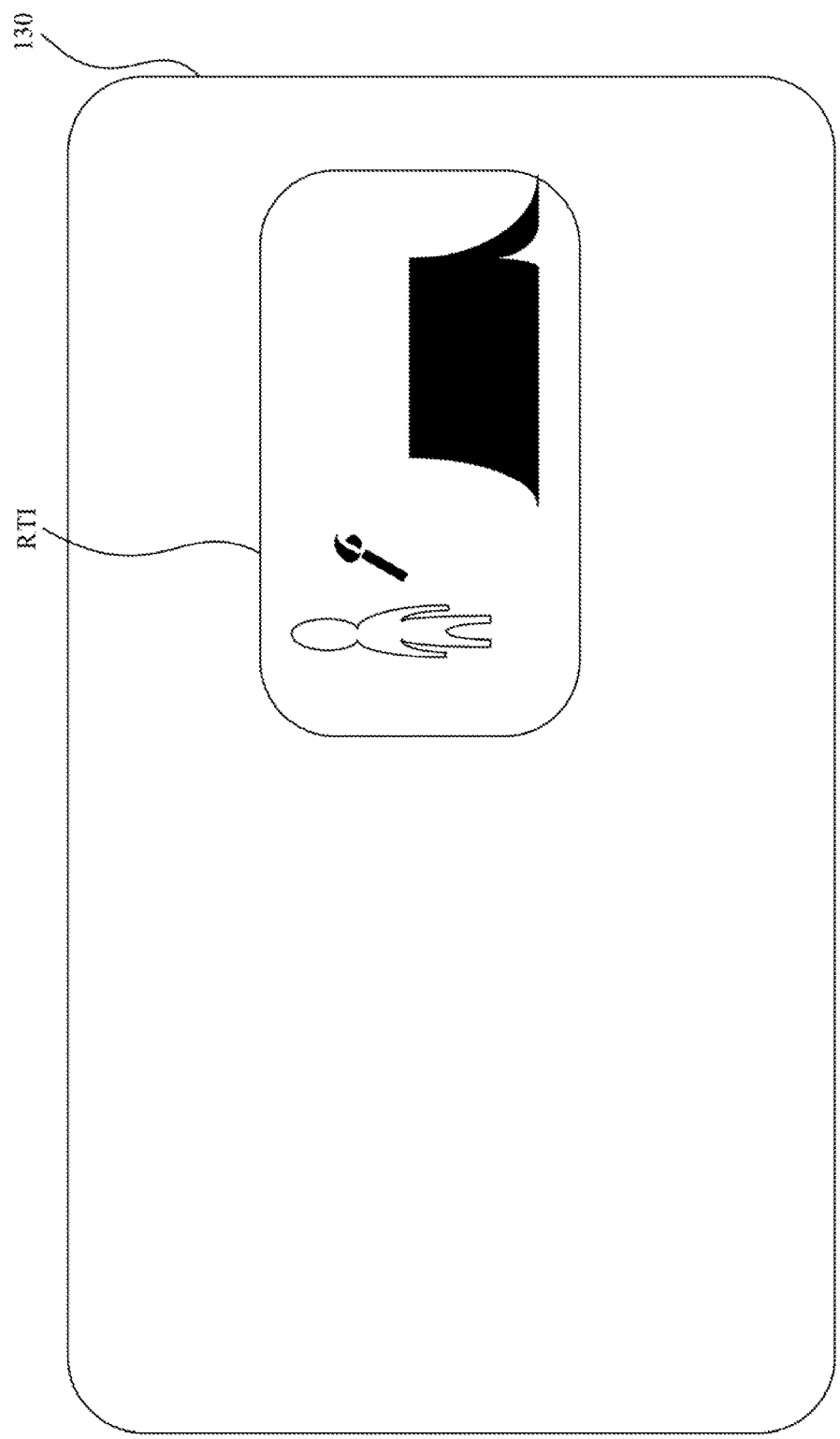
FIG. 5 illustrates an illustrative example of the VR system in accordance with one embodiment of the present disclosure.

Reference is made to FIG. 5. In one embodiment, the one or more processing components 210 may transmit a real time image RTI displayed on the display component 230 to the VR processing device 100 via the network 20. The one or more processing components 110 may receive the real time image RTI displayed on the display component 230 via the network 20, and control the VR display device 130 to operably display the real time image RTI displayed on the display component 230. In one embodiment, the real time image RTI displayed on the display component 230 is operably displayed on the VR display device 130 corresponding to the position and the rotating angles of the VR display device 130. For example, when the VR display device 130 is directed to a certain place in the VR environment VNR where the real time image RTI is disposed at, the VR display device 130 displays the real time image RTI.

Details of the present disclosure are described in the paragraphs below with reference to an operating method of a mobile device in FIG. 6. However, the present disclosure is not limited to the embodiment below.

It should be noted that the method can be applied to a mobile device having a structure that is the same as or similar to the structure of the VR mobile device 200 shown in FIG. 1. To simplify the description below, the embodiment shown in FIG. 1 will be used as an example to describe the method according to an embodiment of the present disclosure. However, the present disclosure is not limited to application to the embodiment shown in FIG. 1.

It should be noted that, in some embodiments, the method may be implemented as a computer program. When the computer program is executed by a computer, an electronic device, or the one or more processing components 210 in FIG. 1, this executing device performs the method. The computer program can be stored in a non-transitory computer readable medium such as a ROM (read-only memory), a flash memory, a floppy disk, a hard disk, an optical disc, a flash disk, a flash drive, a tape, a database accessible from a network, or any storage medium with the same functionality that can be contemplated by persons of ordinary skill in the art to which this invention pertains.

In addition, it should be noted that in the operations of the following method, no particular sequence is required unless otherwise specified. Moreover, the following operations also may be performed simultaneously or the execution times thereof may at least partially overlap.

Furthermore, the operations of the following method may be added to, replaced, and/or eliminated as appropriate, in accordance with various embodiments of the present disclosure.

Figure 6:
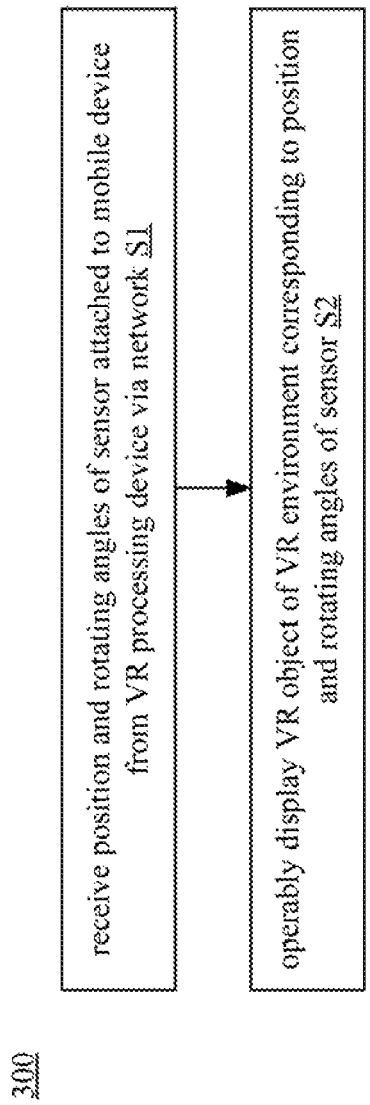
FIG. 6 is a flowchart of a method in accordance with one embodiment of the present disclosure.

Reference is made to FIGS. 1 and 6. The method 300 includes the operations below.

In operation S1, the one or more processing components 210 receive a position and rotating angles of the sensor 150 attached to the mobile device 200 from the VR processing device 100 via the network 20. In one embodiment, the VR processing device 100 communicates with a VR display device 130. The VR display device 130 is configured to display a VR environment VNR corresponding to a position and rotating angles of the VR display device 130.

In operation S2, the one or more processing components 210 control the display component 230 to operably display a VR object of the VR environment VRN corresponding to the position and the rotating angles of the sensor 150.

Details of this method can be ascertained with reference to the paragraphs above, and a description in this regard will not be repeated herein.

Through the operations of one embodiment described above, a person can see the VR objects through the mobile device 200, instead of using another VR display device 130.

Although the present invention has been described in considerable detail with reference to certain embodiments thereof, other embodiments are possible. Therefore, the scope of the appended claims should not be limited to the description of the embodiments contained herein.

What is claimed is:

1. A virtual reality (VR) system comprising:
   a virtual reality display device configured to display a virtual reality environment having a first virtual reality object corresponding to a position and rotating angles of the virtual reality display device;
   a first virtual reality controller;
   a mobile device attached to a sensor, wherein there is a fixed shift on at least one axis between a position of the sensor and a position of the mobile device; and
   a virtual reality processing device configured for:
   acquiring the position and rotating angles of the sensor from the sensor through a connection between the sensor and the virtual reality processing device; and
   transmitting the position and the rotating angles of the sensor to the mobile device via a network,
   wherein the mobile device acquires the position of the mobile device according to the position of the sensor, and operably displays the first virtual reality object according to the position and rotating angles of the mobile device.

2. The virtual reality system as claimed in claim 1, wherein the mobile device is further configured for:
   capturing real world images via a camera of the mobile device; and
   operably displaying the first virtual reality object on the real world images.

3. The virtual reality system as claimed in claim 1, wherein the virtual reality processing device is further configured for:
   transmitting a position and rotating angles of the first virtual reality controller to the mobile device via the network, so as to allow the mobile device to operably display a second virtual reality object corresponding to the position and the rotating angles of the first virtual reality controller according to the position and the rotating angles of the mobile device.

4. The virtual reality system as claimed in claim 3, wherein the virtual reality processing device is further configured for:
   controlling the virtual reality display device to operably display the second virtual reality object corresponding to the position and the rotating angles of the first virtual reality controller.

5. The virtual reality system as claimed in claim 1, wherein the virtual reality processing device is further configured for:
   acquiring a position and rotating angles of a second virtual reality controller; and
   transmitting the position and the rotating angles of the second virtual reality controller to the mobile device via the network, so as to allow the mobile device to operably display a second virtual reality object corresponding to the position and the rotating angles of the second virtual reality controller.

6. The virtual reality system as claimed in claim 1, wherein the virtual reality processing device is further configured for:
   receiving a real time image displayed on the mobile device; and
   controlling the virtual reality display device to operably display the real time image displayed on the mobile device.

7. An operating method of a mobile device comprising:
   receiving a position and rotating angles of a sensor attached to the mobile device from a virtual reality processing device via a network, wherein the virtual reality processing device communicates with a virtual reality display device, the virtual reality display device is configured to display a virtual reality environment having a first virtual reality object corresponding to a position and rotating angles of the virtual reality display device, wherein there is a fixed shift on at least one axis between the position of the sensor and a position of the mobile device;
   receiving the position and the rotating angles of the virtual reality display device from the virtual reality processing device;
   acquiring the position of the mobile device according to the position of the sensor;
   operably displaying the first virtual reality object of the virtual reality environment according to the position and rotating angles of the mobile device.

8. The operating method as claimed in claim 7 further comprising:
   capturing real world images via a camera of the mobile device; and
   operably displaying the first virtual reality object on the real world images.

9. The operating method as claimed in claim 7 further comprising:
   receiving a position and rotating angles of a virtual reality controller from the virtual reality processing device via the network; and
   operably displaying a second virtual reality object corresponding to the position and the rotating angles of the virtual reality controller.

10. A non-transitory computer readable storage medium storing one or more programs comprising instructions, which when executed, causes one or more processing components to perform operations comprising:
    receiving a position and rotating angles of a sensor attached to the mobile device from a virtual reality processing device via a network, wherein the virtual reality processing device communicates with a virtual reality display device, the virtual reality display device is configured to display a virtual reality environment having a first virtual reality object corresponding to a position and rotating angles of the virtual reality display device, wherein there is a fixed shift on at least one axis between the position of the sensor and a position of the mobile device;
    receiving the position and the rotating angles of the virtual reality display device from the virtual reality processing device;
    acquires the position of the mobile device according to the position of the sensor; and
    operably displaying the first virtual reality object of the virtual reality environment according to the position and rotating angles of the mobile device.

11. The non-transitory computer readable storage medium as claimed in claim 10 comprising instructions, which when executed, causes one or more processing components to further perform operations comprising:
    capturing real world images via a camera of the mobile device; and
    operably displaying the first virtual reality object on the real world images.

12. The non-transitory computer readable storage medium as claimed in claim 10 comprising instructions, which when executed, causes one or more processing components to further perform operations comprising:

receiving a position and rotating angles of a virtual reality controller from the virtual reality processing device via the network; and
operably displaying a second virtual reality object corresponding to the position and the rotating angles of the sensor virtual reality controller.

* * * * *